(12) United States Patent
Yoshino et al.

(10) Patent No.: US 10,850,343 B2
(45) Date of Patent: Dec. 1, 2020

(54) SPATTER ANALYSIS METHOD AND DEVICE

(71) Applicant: HONDA MOTOR CO., LTD., Tokyo (JP)

(72) Inventors: Tetsuya Yoshino, Tochigi-Ken (JP); Junya Tanabe, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 15/555,708

(22) PCT Filed: Mar. 4, 2016

(86) PCT No.: PCT/JP2016/056721
§ 371 (c)(1),
(2) Date: Sep. 5, 2017

(87) PCT Pub. No.: WO2016/143683
PCT Pub. Date: Sep. 15, 2016

(65) Prior Publication Data
US 2018/0056429 A1    Mar. 1, 2018

(30) Foreign Application Priority Data

Mar. 6, 2015  (JP) ................................ 2015-044869

(51) Int. Cl.
  *B23K 9/32*     (2006.01)
  *B23K 11/11*    (2006.01)
  (Continued)

(52) U.S. Cl.
  CPC ............ *B23K 9/328* (2013.01); *B23K 9/0953* (2013.01); *B23K 11/11* (2013.01); *B23K 11/16* (2013.01);
  (Continued)

(58) Field of Classification Search
  CPC ...... B23K 9/328; B23K 9/0953; B23K 11/11; B23K 11/25
  (Continued)

(56) References Cited

U.S. PATENT DOCUMENTS 6,703,585 B2    3/2004  Suzuki
2002/0080150 A1*  6/2002  Nakatani ............... G06F 3/0486
                                                    345/660
(Continued)

FOREIGN PATENT DOCUMENTS

CN    101323047 A    12/2008
CN    101323047 A    12/2010
(Continued)

OTHER PUBLICATIONS

PCT/ISA/210 from PCT/JP2016/056721 with the English translation thereof.
(Continued)

*Primary Examiner* — Thien S Tran
(74) *Attorney, Agent, or Firm* — Carrier Blackman & Associates, P.C.; William D. Blackman; Jospeh P. Carrier

(57) ABSTRACT

A spatter production information storage unit stores spots where spatter has been produced. For the spots where spatter has been produced, a comparison information generation unit acquires weld design information stored in a design information storage unit and weld instruction information stored in an instruction information storage unit, compares both pieces of information, and generates comparison information. An image information output unit outputs the generated comparison information to a display device. The display device displays the comparison information on a screen so as to allow checking by an operator. Hence, it is possible to check, on the screen, comparison information for weld instruction information and weld design information (Continued)

highly likely as a cause for spatter being produced, and to efficiently perform the task of analyzing the causes for spatter being produced.

6 Claims, 5 Drawing Sheets

(51) Int. Cl.
    *B23K 11/25*    (2006.01)
    *B23K 11/24*    (2006.01)
    *B23K 31/12*    (2006.01)
    *B23K 11/16*    (2006.01)
    *B23K 9/095*    (2006.01)
    *G06T 1/00*    (2006.01)
    *B23K 101/18*    (2006.01)
    *B23K 103/04*    (2006.01)

(52) U.S. Cl.
    CPC .............. *B23K 11/24* (2013.01); *B23K 11/25* (2013.01); *B23K 31/125* (2013.01); *G06T 1/0014* (2013.01); *B23K 2101/18* (2018.08); *B23K 2103/04* (2018.08)

(58) Field of Classification Search
    USPC ...................... 219/110, 117, 124.34, 130.01
    See application file for complete search history.

(56) References Cited

U.S. PATENT DOCUMENTS

2013/0262000 A1*   10/2013   Hutchison ............ B23K 9/0953
                                                               702/58
2013/0288211 A1    10/2013   Patterson et al.

FOREIGN PATENT DOCUMENTS

| JP | 10-202371 A | 8/1998 |
|---|---|---|
| JP | 2009-066612 A | 4/2009 |
| JP | 2009066612 A * | 4/2009 |

OTHER PUBLICATIONS

Office Action dated Jul. 31, 2018 issued over the corresponding Canadian Patent Application No. 2,978,686.

Office Action dated Feb. 13, 2020 issued over the corresponding Indian Patent Application No. 201747035148.

* cited by examiner

| WELDING DESIGN INFORMATION (SPOT INFORMATION) | | WELDING TEACHIGN INFORMATION (SPOT INFORMATION) | | ANGLE DIFFERENCE |
|---|---|---|---|---|
| POSITION (x1, y1, z1) | PERPENDICULAR TO SURFACE (i1, j1, k1) | POSITION (x1, y1, z1) | GUN (i1, j1, k1) | N1 deg |
| POSITION (x2, y2, z2) | PERPENDICULAR TO SURFACE (i2, j2, k2) | POSITION (x2, y2, z2) | GUN (i2, j2, k2) | N2 deg |
| ... | | ... | | ... |

SPATTER ANALYSIS METHOD AND DEVICE

CROSS REFERENCE TO RELATED APPLICATIONS

This application is based upon, and claims the benefit of priority from PCT Application No. PCT/JP2016/056721 filed Mar. 4, 2016 which, in turn, claimed priority based on Japanese national application JP 2015-044869, filed Mar. 6, 2015. The entire contents of each of these priority applications are incorporated herein by reference.

TECHNICAL FIELD

The present invention relates to a spatter analysis method and device for analyzing spatter caused by spot welding of a workpiece using a welding gun.

BACKGROUND ART

In spot welding of workpieces with a welding gun, so-called sputtering where metal scatters from the workpiece tends to be caused. Sputtering degrades the quality of the welding. For this reason, it is desirable to identify the spots at which sputtering is caused, and suppress the sputtering.

For example, Japanese Laid-Open Patent Publication No. 2009-066612 is disclosed as a technique for checking occurrence of sputtering. According to the technique described in Japanese Laid-Open Patent Publication No. 2009-066612, a gap formed between two workpieces to be welded causes sputtering. The number of occurrences of sputtering is counted for each spot of the workpiece and displayed on the display device. Looking at the display, the operator can identify the spot where sputtering is likely to be caused.

SUMMARY OF INVENTION

According to the technique described in Japanese Laid-Open Patent Publication No. 2009-066612, although the operator can identify the spot where sputtering is likely to be caused, the operator cannot determine the cause of sputtering. For this reason, analysis of the cause of sputtering is required.

It is an object of the present invention to provide a spatter analysis method and device capable of efficiently performing analysis of the cause of sputtering.

A method according to the present invention is a spatter analysis method for analyzing sputtering caused in spot welding of a workpiece with a welding gun, including: a design information storing step of storing welding design information defined by design information on the workpiece as welding information on the welding gun at a time of welding; a teaching information storing step of storing welding teaching information defined by teaching information on a welding robot as welding information on the welding gun at the time of welding; a spatter information storing step of storing a spot at which sputtering is caused during an operation by the welding robot based on the welding teaching information; a comparative information generating step of generating comparative information of the welding design information and the welding teaching information at the spot where the sputtering is caused; and a screen display step of displaying the comparative information on a screen.

In addition, the device according to the present invention is a spatter analysis device for analyzing sputtering caused in spot welding of a workpiece with a welding gun, including: a design information storage unit configured to store welding design information defined by design information on the workpiece as welding information on the welding gun at a time of welding; a teaching information storage unit configured to store welding teaching information defined by teaching information on a welding robot as welding information on the welding gun at the time of welding; a spatter information storage unit configured to store a spot at which sputtering is caused during an operation by the welding robot based on the welding teaching information; a comparative information generating unit configured to generate comparative information between the welding design information and the welding teaching information at the spot where the sputtering is caused; and a screen display unit configured to display the comparative information on a screen.

When designing a workpiece, workpiece design information is created. In this design information, welding design information (position, direction perpendicular to the surface, etc.) on the welding gun at the time of welding is determined for each spot. Teaching information is also created on the welding robot through teaching. In the teaching information, welding teaching information (position, gun direction, etc.) on the welding gun at the time of welding is determined for each spot. The cause of sputtering is often found in the difference between welding design information and welding teaching information. According to the present invention, a spot at which sputtering has been caused is memorized, and comparative information is generated, with respect to the spot at which sputtering has been caused, by comparing the welding design information and the welding teaching information stored in advance. In addition, the generated comparative information is displayed on the screen so that the operator can confirm the information.

According to the present invention, the comparative information of the welding design information and the welding teaching information, which is likely to cause the sputtering, can be confirmed on the screen. Therefore, it is possible to analyze the cause of sputtering efficiently.

BRIEF DESCRIPTION OF DRAWINGS

FIG. 3 is a view showing a report including welding design information, welding teaching information and angle differences;

DESCRIPTION OF EMBODIMENTS

Preferred embodiments of a spatter analysis method and device according to the present invention will be described in detail below with reference to the accompanying drawings.

[Configuration of Spatter Analysis Device 10]

Figure 1:
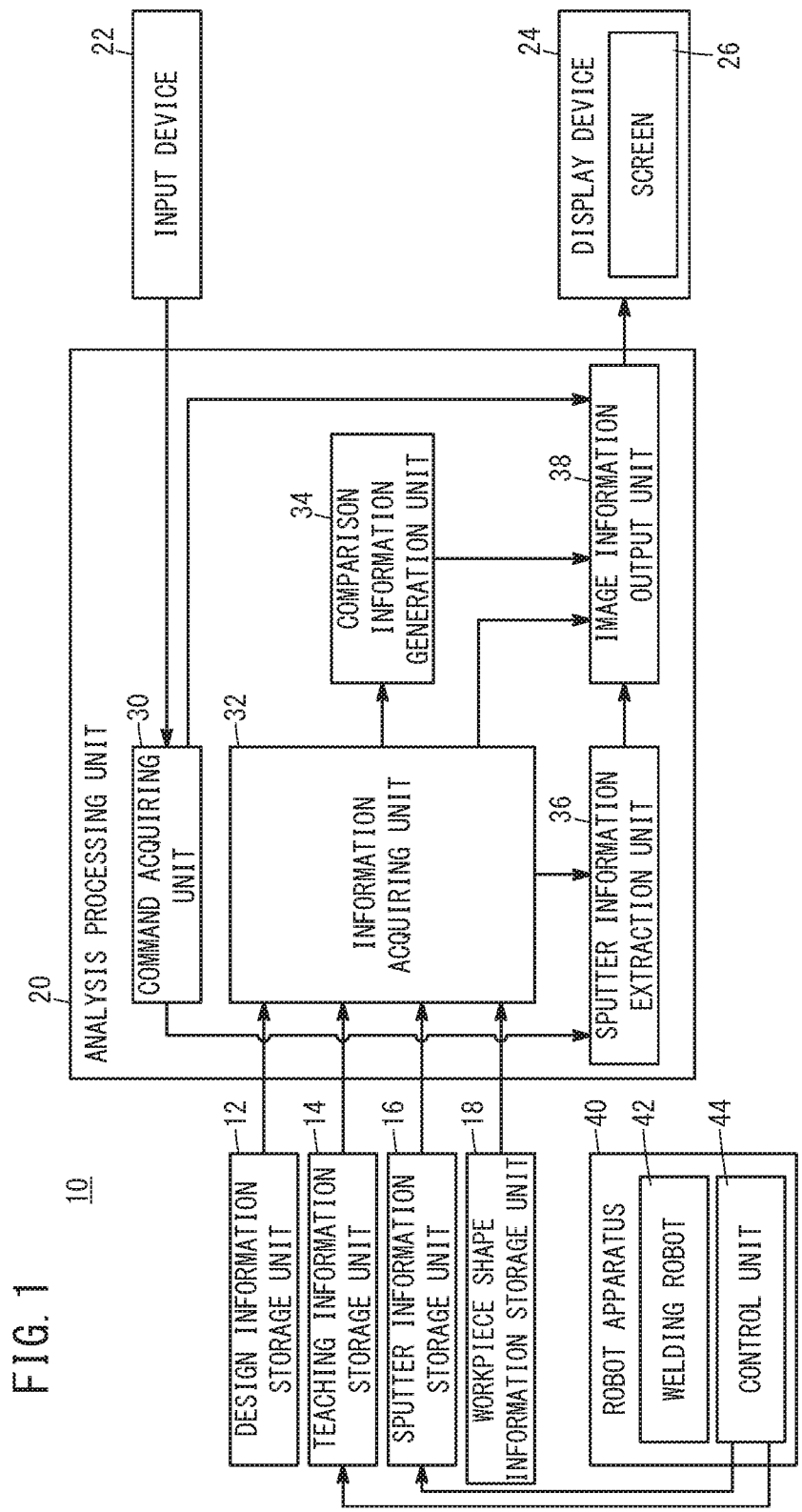
FIG. 1 is a functional block diagram of a spatter analysis device according to the present embodiment.

The configuration of the spatter analysis device 10 according to the present embodiment will be described with reference to FIG. 1. The spatter analysis device 10 includes a design information storage unit 12 for storing welding design information on a welding gun in welding, a teaching information storage unit 14 for storing welding teaching information on the welding gun in welding, a spatter information storage unit 16 for storing spatter information, a workpiece shape information storage unit 18 for storing shape information of a workpiece W (see FIGS. 4, 5A, and 5B; the same applies hereinafter), an analysis processing unit 20 for executing a series of processing relating to spatter analysis, an input device 22 for inputting a command signal to the analysis processing unit 20, a display device 24 for displaying information output from the analysis processing unit 20, and a robot apparatus 40 including a welding robot 42.

The design information storage unit 12 stores, as welding design information created in designing the workpiece W, various pieces of information to be set for each spot, for example, spot number, spot order, positional information, information on a direction perpendicular to a welded surface, panel assembling information, and the like. The positional information is information indicating coordinates (x,y,z) of the spot in the coordinate system with a specific position as a reference. The information on the direction perpendicular to the welding surface is information indicating the direction perpendicular to the welding surface at the spot, that is, the normal direction of the welding plane. Normally, during spot welding, the axis direction of the electrode tip of the welding gun is made to coincide with the normal direction. Therefore, the information on the direction perpendicular to the surface indicates the attitude information of the welding gun. The plate assembling information indicates information on each metal plate assembled at the spot position, and includes information such as a plate thickness, steel type and the like. It is desirable that the design information storage unit 12 is in the form of a database stored in non-volatile computer memory.

The teaching information storage unit 14 stores, as the welding teaching information taught to the welding robot 42, various pieces of information to be set for each spot, for example, spot number, spot order, positional information, gun direction information, welding condition information, etc. The positional information is information indicating coordinates (x,y,z) of the spot in the coordinate system with the specific position as a reference. The gun direction information is attitude information of the welding gun and is information indicating the axial direction of an electrode tip in welding. The welding condition information is information indicating a welding pressure, a current value, an energization time (also referred to as an energizing cycle), and the like for each spot. It is desirable that the teaching information storage unit 14 is in the form of a database stored in non-volatile computer memory.

The spatter information storage unit 16 stores sputtering occurrence history generated at each spot as spatter information. The spatter information includes, for example, the type of the workpiece W, the type of the welding robot 42, the spot number of the welding spot, the order of the welding spot, the date and time of sputtering generation, and the like. The spatter information storage unit 16 stores spatter information by a plurality of welding robots 42. It is desirable that the spatter information storage unit 16 is in the form of a database stored in non-volatile computer memory.

The workpiece shape information storage unit 18 stores three-dimensional shape information of each workpiece W. It is desirable that the workpiece shape information storage unit 18 is in the form of a database stored in non-volatile computer memory.

The analysis processing unit 20 includes a CPU that performs various arithmetic processing, a memory that stores various data, an input/output unit that inputs and outputs data, and the like. The analysis processing unit 20 is configured by, for example, a personal computer. By executing a program stored internally or externally, the analysis processing unit 20 functions as a command acquiring unit 30, an information acquiring unit 32, a comparative information generation unit 34, a spatter information extraction unit 36, and an image information output unit 38. The function of each part will be described in the explanation of the following spatter analysis processing.

The input device 22 includes a mouse, a keyboard, and the like that can be operated by an operator. When the operator performs an input operation via the input device 22, the input device 22 outputs a command signal to the command acquiring unit of the analysis processing unit 20.

The display device 24 includes a screen 26. The display device 24 displays on the screen 26 various information output from the analysis processing unit 20, for example, a shape image of the workpiece W and difference information between welding design information and welding teaching information.

The robot apparatus 40 includes a welding robot 42 having a plurality of joints and rotating shafts, and a control unit 44 for controlling the welding robot 42. The control unit 44 stores the welding teaching information and controls the operation of the welding robot 42 using the welding teaching information.

[Spatter Analysis Processing]

Figure 2:
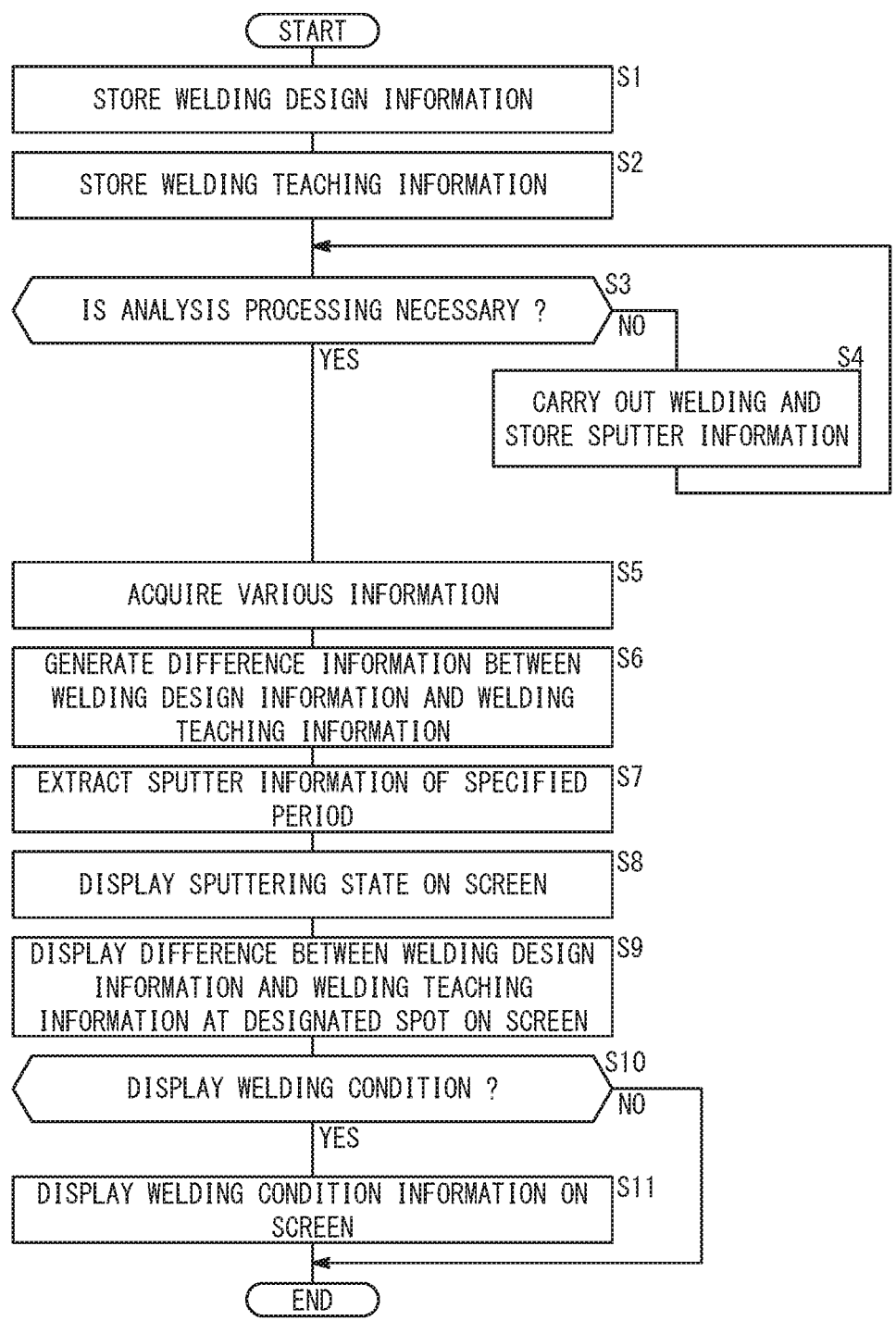
FIG. 2 is a flowchart of a spatter analysis processing according to the present embodiment.

The procedure of the spatter analysis processing according to the present embodiment will be described with reference to FIG. 2.

In step S1, welding design information is stored. When manufacturing a new product, a workpiece W constituting the new product is designed. At that time, the design information of the workpiece W is determined. The design information of the workpiece W includes welding design information. The design information storage unit 12 stores the design information of the workpiece W and the welding design information included therein.

In step S2, welding teaching information is stored. When welding the new workpiece W, teaching process for determining operations of the welding robot 42, so-called teaching, is performed. Through this teaching process, teaching data including welding teaching information is created in the control unit 44 of the robot apparatus 40. The teaching information storage unit 14 obtains and stores welding teaching information from the teaching data stored in the control unit 44.

In step S3, necessity of analysis processing is determined. The operator outputs a command signal for starting the analysis using the input device 22. When the analysis processing unit 20 receives an analysis start command signal from the input device 22, that is, when analysis processing is required (step S3: YES), the analysis processing is started at step S5. On the other hand, when the analysis processing unit 20 does not receive an analysis start command signal from the input device 22, that is, when analysis processing is unnecessary (step S3: NO), the process proceeds to step S4.

In step S4, the workpiece W is welded and spatter information is stored. The control unit 44 operates the welding robot 42 based on the teaching data to perform spot welding. Due to sputtering during spot welding, the resistance value decreases. At this time, the control unit 44 lowers the voltage value in order to keep the current value constant, while recording spatter information. The spatter information is sent to the spatter information storage unit 16 and stored. The process of step S4 is continuously performed until the analysis processing unit 20 receives, from the input device 22, a command signal for starting the analysis.

In step S5, analysis processing is started, and a variety of information is acquired. The information acquiring unit 32 of the analysis processing unit 20 acquires the welding design information from the design information storage unit 12, acquires the welding teaching information from the teaching information storage unit 14, acquires spatter information from the spatter information storage unit 16, and acquires workpiece shape information from the workpiece shape information storage unit 18.

In step S6, the difference information between the welding design information and welding teaching information is generated. The comparative information generating unit 34 compares the spot information (position, direction perpendicular to the surface) included in the welding design information acquired by the information acquiring unit 32 and the spot information (position, gun direction) included in the welding teaching information acquired by the information acquiring unit 32. Then, an angle difference between the information on the direction perpendicular to the surface (attitude information) included in the welding design information and the gun direction information (attitude information) included in the welding teaching information is calculated. Further, as shown in FIG. 3, a report 50 including the welding design information, the welding teaching information and the angle difference of each spot is generated.

In step S7, spatter information within the specified period is extracted. The operator operates the input device 22 to specify a desired sputtering period for analysis. The command acquiring unit 30 instructs the spatter information extraction unit 36 on the designated period. The spatter information extraction unit 36 extracts the spatter information during the specified analysis period. Further, by counting the number of pieces of data of the extracted spatter information for each spot number, the number of spatter occurrences for each spot is calculated.

Figure 4:
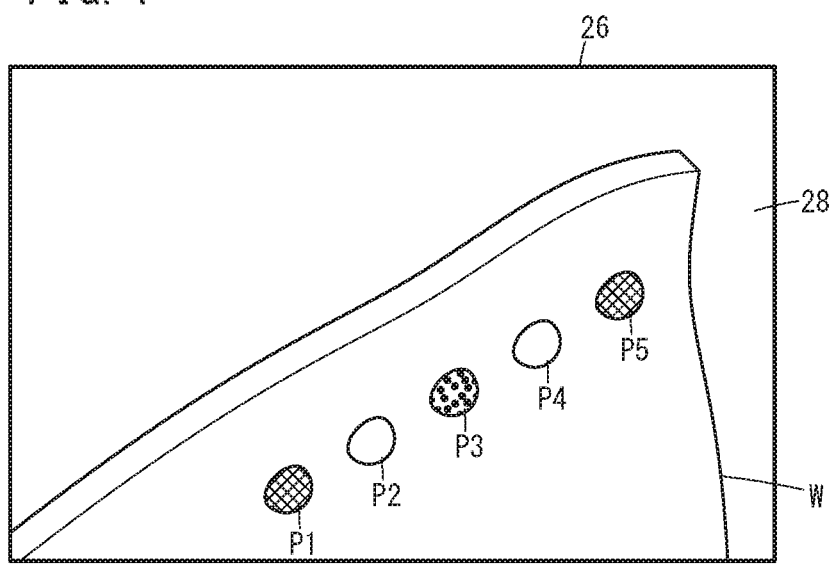
FIG. 4 is a schematic view of a screen showing a workpiece for superimposing and displaying a spot where sputtering has been caused.

In step S8, the spatter occurrence is displayed on the screen 26. The image information output unit 38 generates three-dimensional image information of the workpiece W based on the workpiece shape information and outputs the information to the display device 24. As shown in FIG. 4, the display device 24 displays the three-dimensional image 28 of the workpiece W on the screen 26. At this time, the image information output unit 38 adds information on the number of spatter occurrences for each spot calculated by the spatter information extraction unit 36 to the three-dimensional image information. As shown in FIG. 4, the display device 24 displays each of the spots P1 to P5 as spherical symbols on the image 28 of the workpiece W on the screen 26. Further, each symbol is displayed in a color corresponding to the number of occurrences of sputtering. In this manner, the number of spatter occurrences for each spot, that is, the sputtering state is displayed in the color of the symbol. In this embodiment, the center of the symbol is made coincident with the center of the spot. Therefore, FIG. 4 shows only a part of the symbols on the outer side of the workpiece W.

Figure 5A:
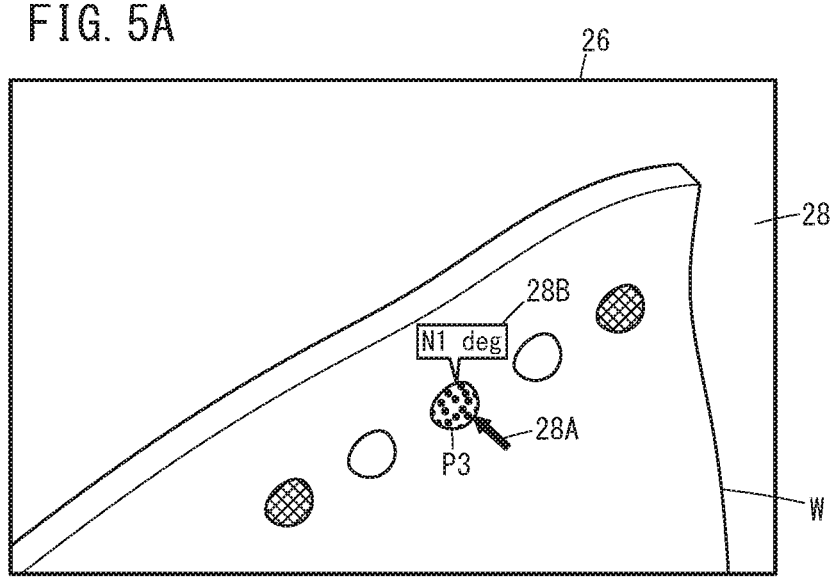
FIG. 5A is a schematic diagram of a screen displaying angle differences.

In step S9, the difference between the welding design information and the welding teaching information at the designated spot is displayed on the screen 26. As shown in FIG. 5A, a pointer 28A that can be operated with a mouse of the input device 22 is displayed on the screen 26. The operator operates the mouse to position the pointer 28A on any symbol of the spots P1 to P5 for which it is desired to investigate the cause of sputtering. The command acquiring unit 30 instructs the image information output unit 38 on any spots P1 to P5 where the pointer 28A is located. Based on the report 50 generated by the comparative information generating unit 34, the image information output unit 38 outputs the designated angle difference information on the spot to the display device 24. As shown in FIG. 5A, the display device 24 displays an angle difference 28B of the spot P3 where the pointer 28A is positioned on the screen 26.

If the attitude of the welding gun deviates greatly from the attitude determined by design, sputtering tends to occur. From the magnitude of the angle difference 28B, the operator can estimate whether the cause of sputtering lies in the attitude deviation of the welding gun.

Sputtering may be caused by welding conditions in addition to the attitude deviation. If the attitude deviation is not confirmed from the angle difference 28B shown on the screen 26 in step S9, the processing from step S10 onward is effective.

In step S10, it is determined whether to display the welding condition or not. The operator uses the input device 22 to output a command signal for displaying the welding condition. For example, the operator operates the mouse to position the pointer 28A on any symbol of the spots P1 to P5, and clicks the mouse. Then, a command signal for displaying the welding condition is output from the input device 22. When the analysis processing unit 20 receives the command signal for displaying the welding condition from the input device 22, the process proceeds to step S11 and the welding condition is displayed. On the other hand, if the analysis processing unit 20 does not receive the command signal for displaying the welding condition from the input device 22, the series of processing ends.

Figure 5B:
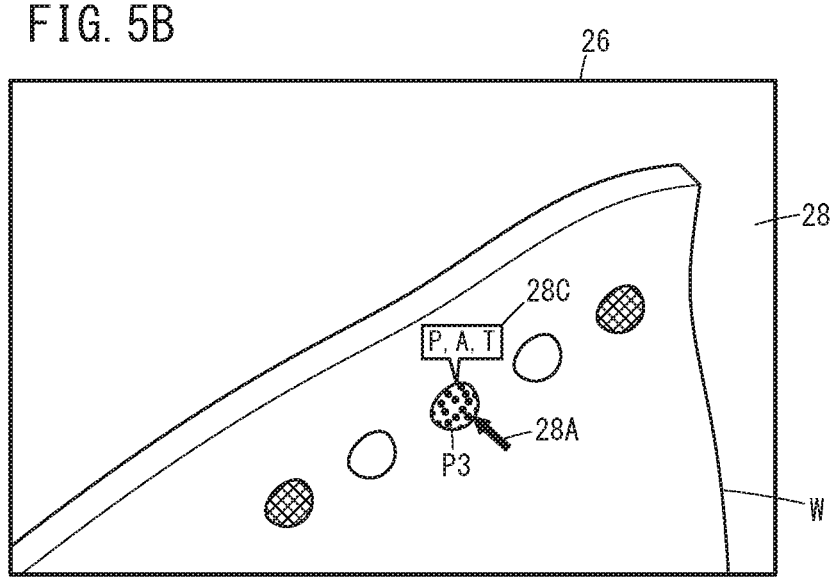
FIG. 5B is a schematic view of a screen displaying welding conditions.

In step S11, the welding condition at the designated welding spot is displayed on the screen 26. The command acquiring unit 30 instructs the image information output unit 38 on the clicked spots P1 to P5. The image information output unit 38 acquires welding condition information (welding pressure, current value, energization time) included in the welding teaching information acquired by the information acquiring unit 32, and displays the welding condition information of the designated welding spot on the display device 24. As shown in FIG. 5B, the display device 24 displays welding conditions 28C of the spot P3 where the pointer 28A is positioned on the screen 26. From this welding condition 28C, the operator can estimate whether the cause of sputtering is in the welding condition.

SUMMARY OF THE EMBODIMENT

The method according to the present embodiment is a spatter analysis method for analyzing sputtering that is caused in spot welding of a workpiece W with a welding gun. The method includes: a design information storing step (step S1) of storing welding design information defined by design information of the workpiece W, as welding information on a welding gun at the time of welding; a teaching information storing step (step S2) of storing welding teaching information defined by teaching information of the welding robot 42, as welding information on the welding gun at the time of welding; a spatter information storing step (step S4) for storing a spot at which sputtering is caused during an operation by the welding robot 42 based on the welding teaching information, a comparative information generating step (step S6) of generating comparative information between the welding design information and the welding teaching information at the spot where the sputtering is caused; and a screen display step (Step S9) for displaying the comparative information on the screen 26.

The device according to the present embodiment is the spatter analysis device 10 for analyzing sputtering caused in spot welding a workpiece W with a welding gun, including: a design information storage unit 12 for storing welding design information defined by design information of a workpiece W, as welding information on a welding gun at the time of welding; a teaching information storage unit 14 for storing welding teaching information defined by teaching information of the welding robot 42, as welding information on the welding gun at the time of welding, a spatter information storage unit 16 for a spot at which the sputtering is caused during an operation by the welding robot 42 based on the welding teaching information; a comparative information generating unit 34 for generating comparative information (report 50, angle difference 28B) of the welding design information and the welding teaching information at the spot at which the sputtering is caused; and a screen display unit (image information output unit 38, display device 24) for displaying the comparative information (report 50, angle difference 28B) on the screen 26.

According to the present embodiment, it is possible to confirm on the screen 26 the comparative information between the welding design information and the welding teaching information, which is likely to be a cause of sputtering. Therefore, it is possible to analyze the cause of sputtering efficiently. The operator can reduce the occurrence of sputtering by correcting the welding teaching information so as to reduce the difference.

Further, in the present embodiment, the welding design information and the welding teaching information include attitude information (information on the direction perpendicular to the surface, gun direction information) at the time of welding the welding spot with the welding gun. The difference between the welding design information and the welding teaching information is the difference between the attitude information (information on the direction perpendicular to the surface) included in the welding design information and the attitude information (gun direction information) included in the welding teaching information.

According to the present embodiment, it is possible to confirm on the screen 26 whether the difference between the attitude information (information on the direction perpendicular to the surface) of welding design information and the attitude information (gun direction information) of welding teaching information is so high that sputtering may be caused. Therefore, it is possible to analyze the cause of the sputtering more efficiently.

In the present embodiment, the welding teaching information includes at least one of the welding pressure, the current value, and the energization time at the welding spot. Then, the screen display unit (the image information output unit 38, the display device 24) further performs a welding condition display step (step S11) for displaying on the screen 26 at least one of the welding pressure, the current value, and the energization time.

According to this embodiment, when the cause of sputtering is not found in the attitude information, it is possible to confirm the welding condition information, that is, the welding pressure, the current value, and the energization time, which is likely to be a cause of sputtering. Therefore, it is possible to analyze the cause of sputtering more efficiently.

OTHER EMBODIMENTS

It is also possible to store the report 50 generated by the comparative information generating unit 34 in a storage device.

It is also possible to display the welding spot position of the welding design information included in the report 50 and the spot position included in the welding teaching information on the screen 26 shown in FIG. 4.

It is not necessary to generate the report 50. In this case, when the pointer 28A is moved to the spots P1 to P5, the comparative information generating unit 34 may acquire the welding design information and the welding teaching information at the spots P1 to P5 and generate the comparative information based thereon.

In addition to the attitude information of the welding gun and the welding condition information, information that can cause sputtering can be acquired from the welding design information and/or the welding teaching information and displayed on the screen 26.

Comparative information, welding condition information, and other information, for example, a list of plate assembly information etc., at each of the spots P1 to P5, may be displayed on the screen 26 in advance. Further, it is also possible to highlight display the comparative information, the welding condition information and other information of the instructed spots P1 to P5, in response to move or click operation of the pointer 28A.

The invention claimed is:

1. A computer-implemented spatter analysis method for analyzing sputtering caused in spot welding of a workpiece with a welding gun, said spatter analysis method including:
   a design information storing step of storing welding design information defined by design information on the workpiece as welding information on the welding gun at a time of welding, wherein said welding design information is stored as data in nonvolatile computer memory;
   a teaching information storing step of storing welding teaching information defined by teaching information on a welding robot as welding information on the welding gun at the time of welding, wherein said welding teaching information is stored as data in nonvolatile computer memory;
   a step of operating a welding robot with a control unit to perform spot welding on a workpiece based on the stored welding teaching information;
   a spatter information storing step of storing information relating to a welding spot at which spattering is caused during operation by the welding robot based on the welding teaching information;
   a difference information generating step of generating difference information derived from a comparison of the welding design information and the welding teaching information at the spot where the spattering is caused, wherein the difference information is generated by an analysis processing unit on a computer; and
   a screen display step of displaying the difference information on a screen.

2. The spatter analysis method according to claim 1, wherein the welding design information and the welding teaching information include attitude information at the time of welding the welding spots with the welding gun, and
   wherein the difference between the welding design information and the welding teaching information is a difference between the attitude information included in the welding design information and the attitude information included in the welding teaching information.

3. The spatter analysis method according to claim 2, wherein the welding teaching information includes at least one piece of information of a welding pressure, a current value, and an energization time at the welding spot, and the spatter analysis method further includes a welding condition display step of displaying the at least one piece of information of the welding pressure, the current value, and the energization time, on the screen.

4. A spatter analysis device for analyzing spattering caused in spot welding of a workpiece with a welding gun, said splatter analysis device including:

a design information storage unit configured to store welding design information defined by design information on the workpiece as welding information on the welding gun at a time of welding, wherein said welding design information is stored as data in nonvolatile computer memory;

a teaching information storage unit configured to store welding teaching information defined by teaching information on a welding robot as welding information on the welding gun at the time of welding, wherein said welding teaching information is stored as data in non-volatile computer memory;

a control unit operable to control operation of a welding robot in spot welding a workpiece based on the stored welding teaching information;

a spatter information storage unit configured to store information relating to a welding spot at which spattering is caused during operation by the welding robot based on the welding teaching information;

a difference information generating unit configured to generate difference information derived from a comparison between the welding design information and the welding teaching information at the spot where the spattering is caused; and a screen display unit configured to display the difference information on a screen.

5. The spatter analysis device according to claim 4, wherein the welding design information and the welding teaching information include attitude information at the time of welding the welding spots with the welding gun, and wherein the difference between the welding design information and the welding teaching information is a difference between the attitude information included in the welding design information and the attitude information included in the welding teaching information.

6. The spatter analysis device according to claim 5, wherein the welding teaching information includes at least one piece of information of a welding pressure, a current value, and an energization time at the welding spot, and the screen display unit is configured to display the at least one piece of information of the welding pressure, the current value, and the energization time on the screen.

* * * * *

UNITED STATES PATENT AND TRADEMARK OFFICE
CERTIFICATE OF CORRECTION

PATENT NO. : 10,850,343 B2
APPLICATION NO. : 15/555708
DATED : December 1, 2020
INVENTOR(S) : Tetsuya Yoshino and Junya Tanabe It is certified that error appears in the above-identified patent and that said Letters Patent is hereby corrected as shown below:

Column 9, Line 3, Claim 4:
Change "SPLATTER" to -- SPATTER --

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*